UNITED STATES PATENT OFFICE.

CHAS. H. ALSOP, OF MIDDLETOWN, CONNECTICUT.

IMPROVED SNAP-HOOK.

Specification forming part of Letters Patent No. 57,456, dated August 28, 1866.

*To all whom it may concern:*

Be it known that I, CHARLES H. ALSOP, of Middletown, in the county of Middlesex and State of Connecticut, have invented a new and Improved Snap-Hook; and I do hereby declare that the following is a full, clear, and exact description thereof, which will enable others skilled in the art to make and use the same, reference being had to the accompanying drawings, forming part of this specification.

The present invention consists in forming a snap-hook of two separate hooks, both made of a flat shape, and riveted or otherwise properly secured together at one end, one upon the other, with the hooks overlapping, but free from each other, and extending in opposite directions, in combination with swiveling such hooks thus secured together to a common eye-frame, as will be apparent from the following detailed description thereof, reference being had to the accompanying plate of drawings, in which—

Figure 1:
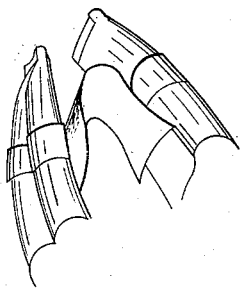
Figure 1:
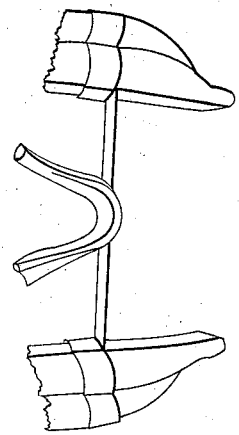
Figure 1:
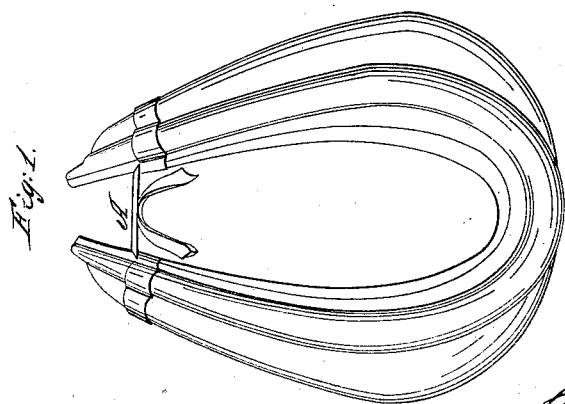

Figure 1 is a view of one side of the snap-hook; and Fig. 2, a section, taken through the hook in the plane of the line $x\ x$ and in the direction of its length.

Similar letters of reference indicate like parts.

A in the drawings represents my improved snap-hook, consisting of two similar hooks, B B, made of any suitable metal or other material, and secured together at one end, C, by riveting or in any other proper manner, with their hook-ends D overlapping, but free of each other and extending in opposite directions, as plainly shown in Fig. 1 of the drawings. E is the eye-frame, made of a rectangular or any other suitable shape, to one side of which eye the ends of the hooks B, that are fastened together are swiveled, so as to freely turn thereon, the advantages and importance of which are obvious.

I claim as new and desire to secure by Letters Patent—

The hooks B B, secured together at one end one upon the other, and swiveled at such end to the eye-frame E, substantially as and for the purpose described.

The above specification of my invention signed by me.

CHAS. H. ALSOP.

Witnesses:
ARTHUR W. BACON,
ALFRED HALL.

C. Alvord,
Horse Collar.

No. 57,457. Patented Aug. 28, 1866.

Witnesses:
C. A. Alvord
J. A. Townsend

Inventor:
Clark Alvord